United States Patent
Parks et al.

(10) Patent No.: US 8,056,330 B2
(45) Date of Patent: Nov. 15, 2011

(54) TORQUE CONVERTER WITH MULTI-SEGMENT CORE RING

(75) Inventors: Kevin Parks, Wooster, OH (US); Michael Vansickle, Akron, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 677 days.

(21) Appl. No.: 12/217,798

(22) Filed: Jul. 9, 2008

(65) Prior Publication Data

US 2009/0013683 A1    Jan. 15, 2009

Related U.S. Application Data

(60) Provisional application No. 60/959,261, filed on Jul. 12, 2007.

(51) Int. Cl.
*F16D 33/20* (2006.01)

(52) U.S. Cl. .......................................................... 60/367

(58) Field of Classification Search ...................... 60/367
See application file for complete search history.

(56) References Cited

U.S. PATENT DOCUMENTS

| | | | | |
|---|---|---|---|---|
| 1,286,283 A | * | 12/1918 | Gilson | .................. 29/889.21 |
| 2,216,747 A | * | 10/1940 | Klimek | ............................ 60/367 |
| 2,421,360 A | * | 5/1947 | Swennes | ........................ 60/367 |
| 2,632,397 A | * | 3/1953 | Jandasek | ........................ 60/367 |
| 4,905,471 A | | 3/1990 | Mori | |
| 5,065,509 A | | 11/1991 | Sahashi | |
| 2004/0172936 A1 | | 9/2004 | Mueller et al. | |

FOREIGN PATENT DOCUMENTS

DE    39 31 427 A1    4/1990

* cited by examiner

*Primary Examiner* — Daniel Lopez
(74) *Attorney, Agent, or Firm* — Davidson, Davidson & Kappel, LLC

(57) ABSTRACT

A torque converter includes a plurality of blades and a core ring supporting the plurality of blades. The core ring includes at least two segments, each segment having two circumferential ends. A core ring and method are also provided.

11 Claims, 5 Drawing Sheets

TORQUE CONVERTER WITH MULTI-SEGMENT CORE RING

Priority to U.S. Provisional Patent Application Ser. No. 60/959,261, filed Jul. 12, 2007, is claimed, the entire disclosure of which is hereby incorporated by reference herein.

The present invention relates generally to torque converters and their methods of production.

BACKGROUND

U.S. Patent Publication No. 2004/0172936, hereby incorporated by reference herein, describes a torque converter, and shows a core ring with blades attached thereto.

U.S. Pat. No. 4,905,471 describes a blade fixing mechanism for a torque converter without using a core ring. A plurality of blades are secured to the shell and are spaced in the circumferential direction of the shell. A flange of each blade connecting the neighboring blades securing one another in a watertight manner.

U.S. Pat. No. 5,065,509, hereby incorporated by reference herein, describes a method for securing a blade for a torque converter. A plurality of blades are spaced and secured to the surface of a concave shell and a core ring along the circumferential direction of the shell. Tabs fitting through the slots of the shell and the core ring form integrally on the convex and concave periphery of the blades, respectively. Ribs are also formed on the ends of the convex and concave periphery of the blades. Both the convex and concave peripheries are brazed to the shell and the core ring respectively.

DE 39 31 427 A1, describes a pump and turbine wheel. Individual segments with blades are used to create an annular core space.

SUMMARY OF THE INVENTION

The present invention provides a torque converter comprising: a plurality of blades; and a core ring supporting the plurality of blades, the core ring including at least two segments, each segment having two circumferential ends.

By having a multipart core ring, scrap can be reduced and assembly simplified. By having a core ring segment supporting a plurality of blades, the core ring segments also can be formed simply, for example by stamping, as opposed to being formed with a single blade.

The present invention also provides a torque converter core ring comprising a core ring supporting the plurality of blades, the core ring including at least two segments, each segment having two circumferential ends.

The present invention also provides a method for forming a torque converter comprising connecting circumferential ends of two segments, each segment having two circumferential ends and placing blades on the segments.

BRIEF DESCRIPTION OF THE DRAWINGS

Further features and advantages of the invention will become apparent from the following detailed description taken in conjunction with the accompanying drawings, in which.

DETAILED DESCRIPTION

Figure 1:
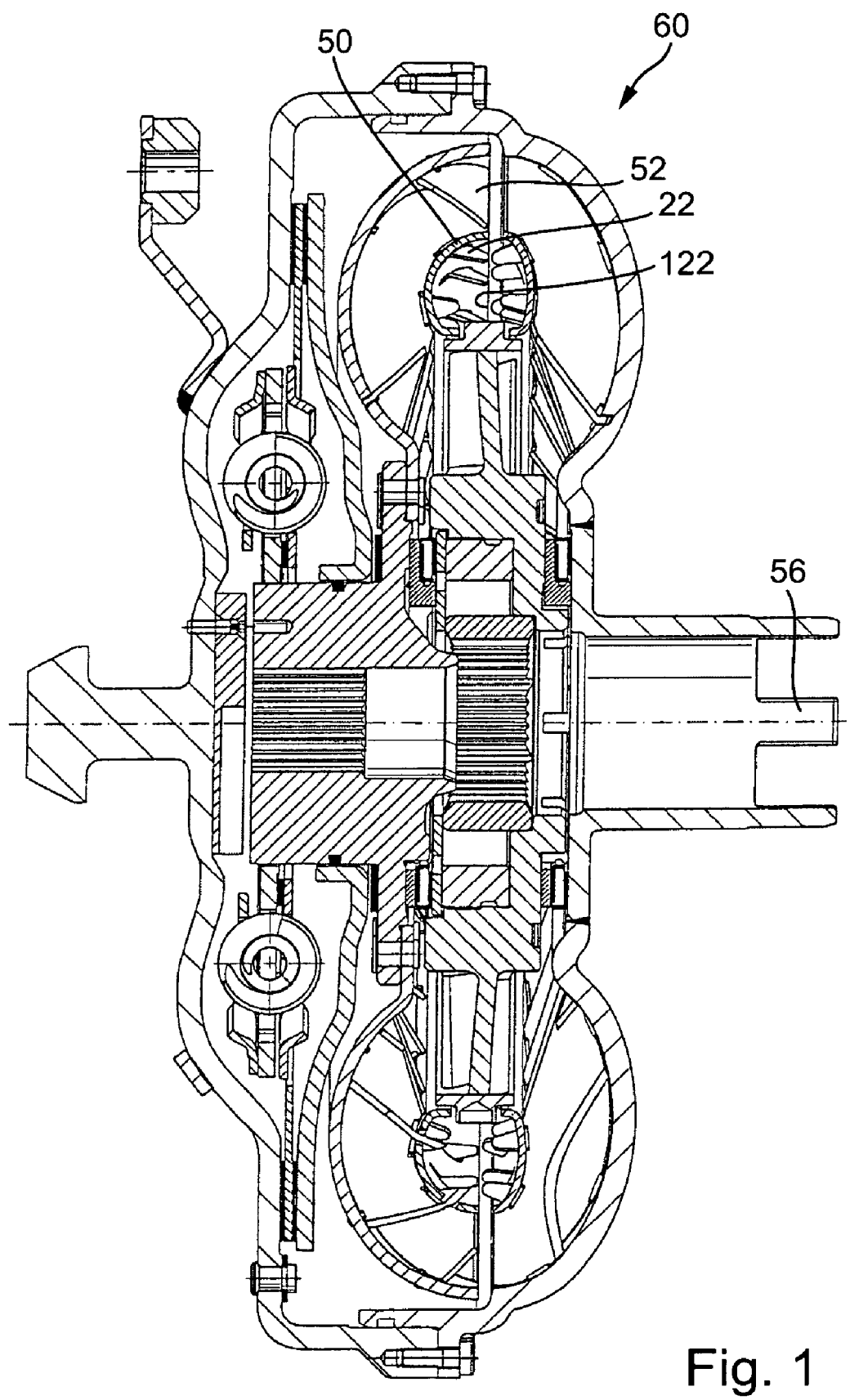
FIG. 1 illustrates a torque converter of the present invention.
Figure 2:
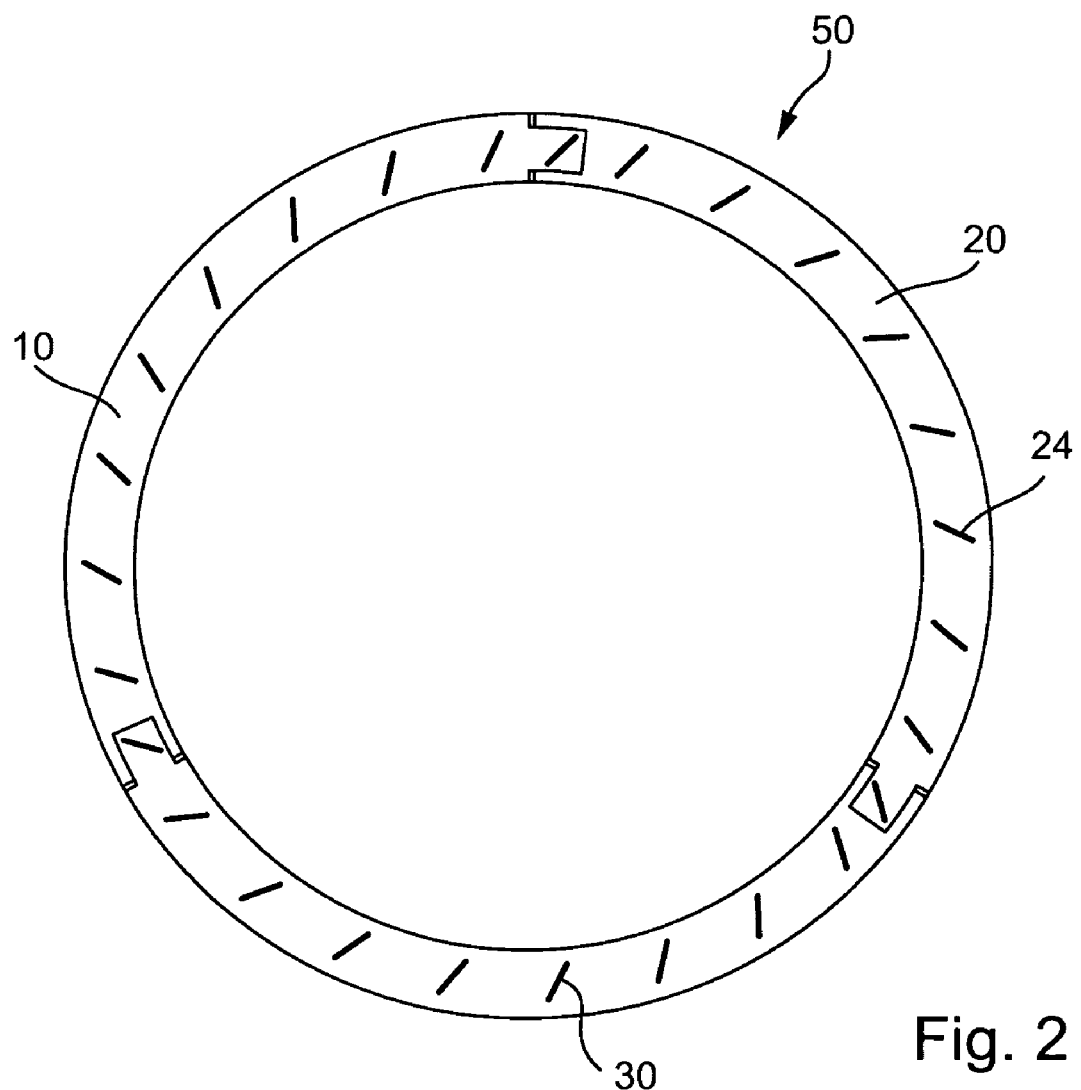
FIG. 2 illustrates a core ring according to the present invention.
Figure 3:
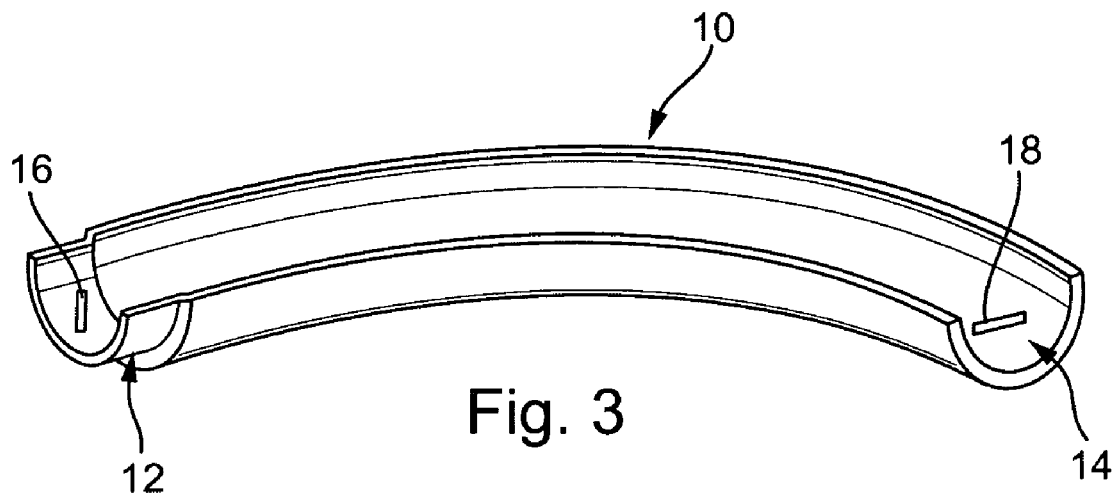
FIG. 3 illustrates a perspective view of an inventive core ring in accordance with an embodiment of the present invention.

FIG. 1 shows in cross section a torque converter 60 having a core ring 50 and a plurality of blades 52. Blades 52 have tabs 22, 122 extending through slots in core ring 50. Core ring 50 extends circumferentially about an axis 56. Core rings to date have typically been continuous in the circumferential direction. Alternatively, the blade sections themselves have formed an inner boundary. With the present invention, core ring 50 supporting blades 52 has at least two segments, each having a circumferential end. FIG. 2 and FIG. 3 show an embodiment where core ring 50 has three segments 10, 20, 30 in the circumferential direction, with discontinuities defined by ends of the segments. Slots 24 run through out each segment circumferentially with the shape of the core ring. Each segment 10, 20, 30 supports a plurality of blades.

FIG. 3 illustrates core ring segment 10 with a first circumferential end 12 made to assemble with other segments to form the core ring in accordance with an embodiment of the present invention. As shown in FIG. 3, the outer side of core ring segment 10 is convex and the inner side of core ring segment 10 is concave. First circumferential end 12 is a compressed portion and is at one end of core ring segment 10. Opposite first circumferential end 12 on core ring segment 10 is a first opposite end 14. Slots 16 and 18 are positioned within first circumferential end 12 and opposite end 14.

Figure 4:
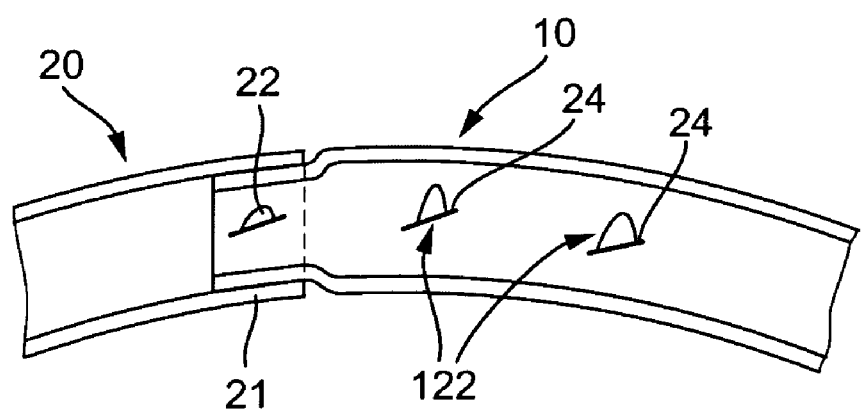
FIG. 4 illustrates a top view of the inventive core ring assembled with adjacent segment in accordance with an embodiment of the present invention.

FIG. 4 illustrates the top view of assembled adjacent core ring segments 10 and 20. When adjacent core ring segments 10 and 20 are assembled together first circumferential end 12 is inserted to a second opposite end 21 of adjacent segment 20. Slots 16 and 18 of the respective segments are positioned to align with one another when this happens. A blade tab 22 passes through slot 16 of segment 10 and the opposing slot of adjacent segment 20, similar to slot 18. Blade tab 22 is bent over into the interior of core ring segments 10, 20. Additional slots 24 are located within core ring segments 10, 20. Receive tabs 122 of adjacent blades pass through slots 24.

For the embodiment above, it is preferred that the total number of blades 52 for core ring 50, be divisible by an integer. For example, a pump or turbine with 27 blades could be used to position 9 blades each. If however, the number of blades is a prime number, one of the segments must have a different number of slots. For example, a component with 31 blades might have two segments positioning 10 blades and one segment positioning 11 blades. This however can make assembly more difficult and increase costs.

Instead of first circumferential end 12 being compressed, first circumferential end 12 also could be expanded so it could fit over circumferential end 14, or the circumferential ends 12, 14 could be connected in other ways. Tack, spot or projection welds could be used, or a tab at one circumferential end inserted into a slot in the other circumferential end, or a press or friction fit can occur between the circumferential ends. Slots for the blades, including any through the ends, may also be punched after the segments have been joined.

Figure 5:
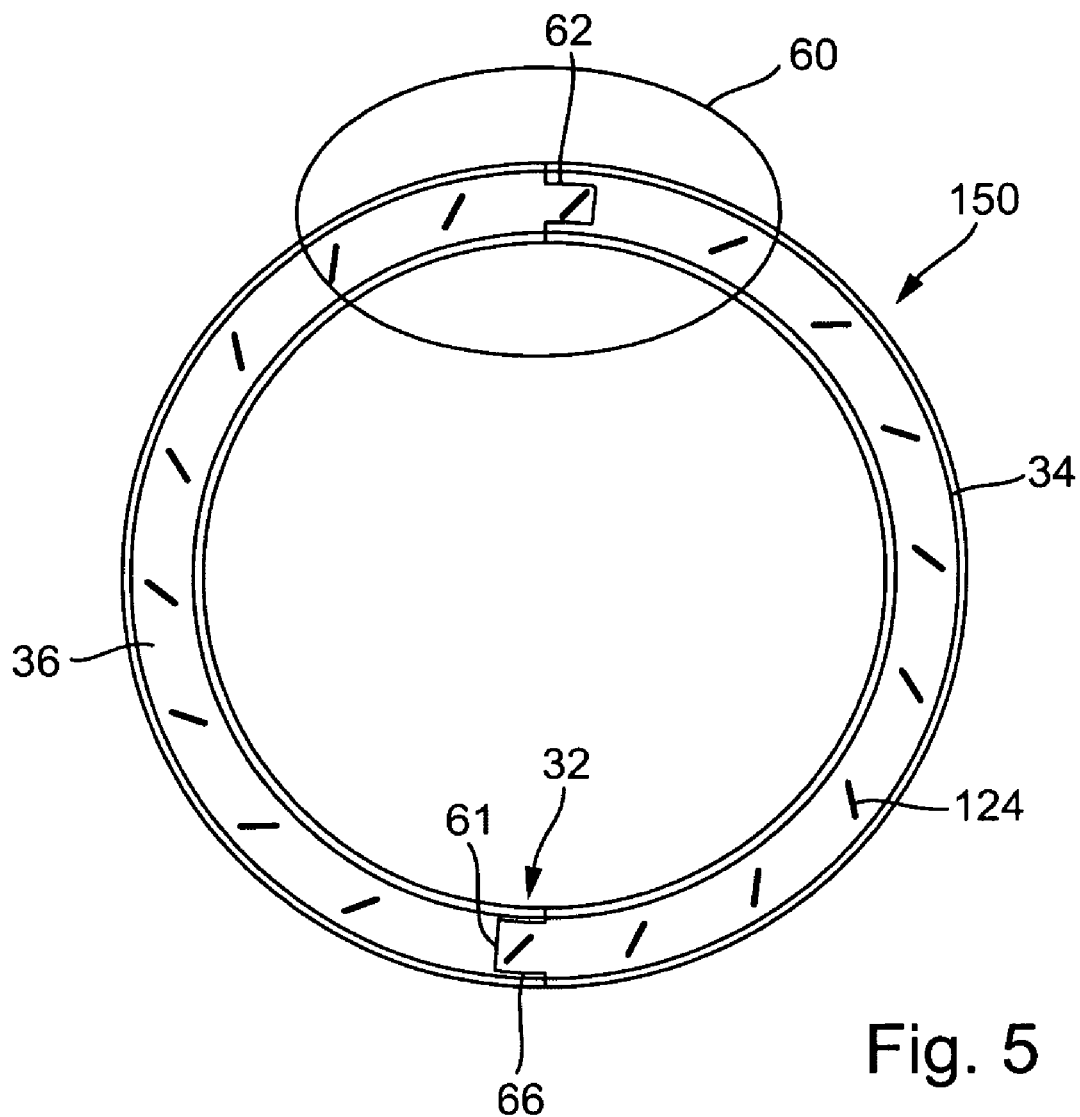
FIG. 5 illustrates the top view of an inventive core ring in accordance with an alternative embodiment of the present invention.

FIG. 5 illustrates an alternative embodiment where a core ring 150 is made of a single component having two segments and has an area 60 which has a section 62 which has an end, but at least one part of the end remains integral and continuous. Core ring 150 however, has two arc segments 34, 36 which connect at a discontinuous area 32, where segment 36 has a circumferential end 66 and segment 34 has a circumferential end 64. End 66 may be similar to end 14 and end 34 similar to end 12. At area 60 however, segments 34, 36 have ends where a continuous area 60 remains.

Figure 6:
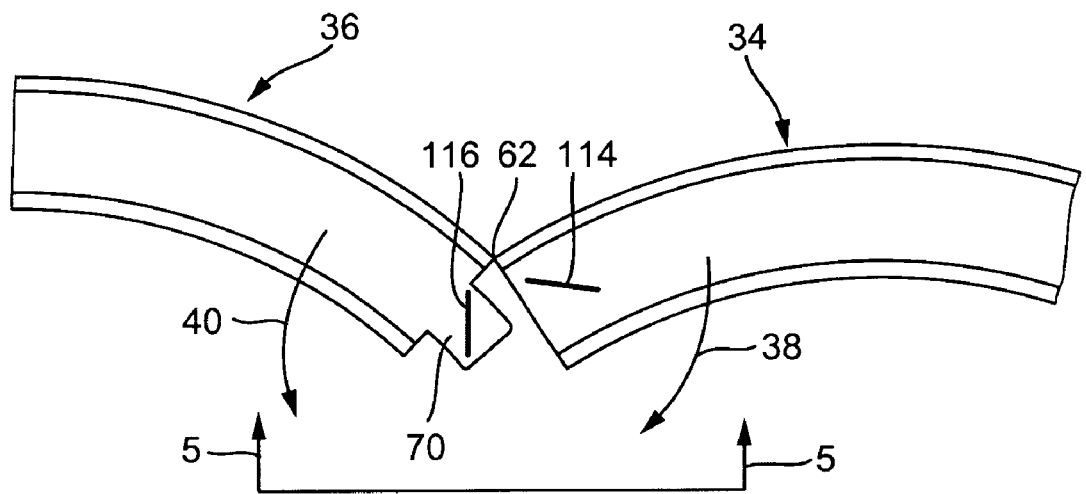
FIG. 6 illustrates a partial view of the circled area in FIG. 5 stamped before being bent into a ring.

As shown in FIG. 6, a tab 70 and section 62 can remain after stamping and forming, with tab 70 having a slot 116 and segment 34 having a slot 114, slots 114, 116 matching up after bending in directions 40, 38. Section 62 can thus be stretched, for example, after bending. Tab 70 can also be a separate piece brazed or otherwise attached to segment 36, as opposed to being produced by stamping and bending. Slots 114, 116 also can be eliminated as continuous section 62 connects segments 34, 36 so that any number of slots can be used, including an uneven number of slots. However, a slot at ends 64 and 66 is desired for connecting ends 64, 66.

As shown in FIG. 6, arc segments 34 and 36 each comprise half of core ring 150. Arc segments 34 and 36 are bent in a direction 38 and 40 respectively to form the inventive core ring 150.

Figure 7:
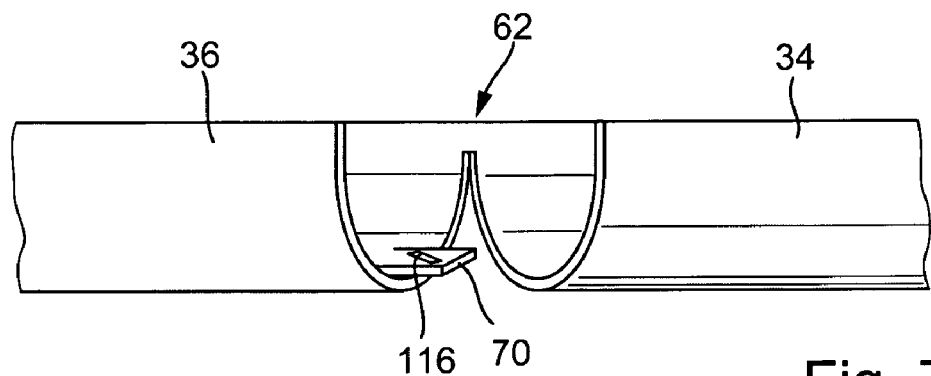
FIG. 7 illustrates a view in the direction of 5-5' in FIG. 6.

FIG. 7 illustrates the section 5-5' of FIG. 6. Once the notch area of FIG. 6 is removed, arc segments 34 and 36 remain connected in portion 62. Section 62 can be stretched during bending and formation of core ring 150.

Core ring 50 may be made, for example, of low carbon steel, for example steel 1018, and may be brazed before and/or after blades 52 are inserted.

What is claimed is:

1. A torque converter comprising:
    a plurality of blades; and
    a core ring supporting the plurality of blades, the core ring including at least two segments, each segment having two circumferential ends, wherein one of the plurality of blades passes through the circumferential ends.
2. The torque converter as recited in claim 1 wherein two of the segments are continuously connected.
3. The torque converter as recited in claim 2 wherein the segments are continuously connected at two of the circumferential ends.
4. The torque converter as recited in claim 1 wherein one of the circumferential ends of one segment includes a compressed portion, formed to fit another circumferential end of another segment.
5. The torque converter as recited in claim 1 wherein the segments have a plurality of blade tab slots.
6. The torque converter as recited in claim 1 wherein a number of the blades is divisible by a number of the segments to form an integer.
7. The torque converter as recited in claim 5 wherein the blades have tabs, the blade tabs bending over the core ring.
8. The torque converter as recited in claim 1 wherein the segments are stamped low carbon steel.
9. The torque converter as recited in claim 1 wherein the segments are brazed.
10. A torque converter core ring comprising:
    a core ring for supporting a plurality of blades, the core ring including at least two segments, each segment having two circumferential ends, wherein one of the blades passes through the circumferential ends.
11. A method for forming a torque converter comprising:
    connecting circumferential ends of two segments, each segment having two circumferential ends;
    placing blades on the segments; and
    passing one of the blades through the circumferential ends.

* * * * *